United States Patent
Manfred

(10) Patent No.: US 11,788,902 B2
(45) Date of Patent: Oct. 17, 2023

(54) ACCURATE TEMPERATURE READING OF FLUID NEAR INTERFACE

(71) Applicant: ENTEGRIS, INC., Billerica, MA (US)

(72) Inventor: Michael Manfred, Minnetonka, MN (US)

(73) Assignee: ENTEGRIS, INC., Billerica, MA (US)

( * ) Notice: Subject to any disclaimer, the term of this patent is extended or adjusted under 35 U.S.C. 154(b) by 294 days.

(21) Appl. No.: 17/116,738

(22) Filed: Dec. 9, 2020

(65) Prior Publication Data

US 2021/0190602 A1      Jun. 24, 2021

Related U.S. Application Data

(60) Provisional application No. 62/951,474, filed on Dec. 20, 2019.

(51) Int. Cl.
| | |
|---|---|
| *G01K 7/42* | (2006.01) |
| *G01N 21/41* | (2006.01) |
| *G01K 13/02* | (2021.01) |

(52) U.S. Cl.
CPC ............ *G01K 7/427* (2013.01); *G01K 13/02* (2013.01); *G01N 21/41* (2013.01); *G01N 21/4133* (2013.01); *G01N 2021/414* (2013.01)

(58) Field of Classification Search
CPC .. G01K 7/427; G01K 13/02; G01N 2021/414; G01N 21/41; G01N 21/4133
See application file for complete search history.

(56) References Cited

U.S. PATENT DOCUMENTS

| | | | | |
|---|---|---|---|---|
| 2,549,402 A | * | 4/1951 | Vossberg, Jr. ......... | G01N 23/16 378/160 |
| 4,073,182 A | * | 2/1978 | Allington ............ | G01N 21/4133 73/1.02 |
| 6,067,151 A | * | 5/2000 | Salo ....................... | G01N 21/43 356/135 |
| 7,319,523 B2 | * | 1/2008 | Chiarello ........... | G01N 21/0303 356/136 |

(Continued)

FOREIGN PATENT DOCUMENTS

| | | |
|---|---|---|
| JP | 06273329 A | 9/1994 |
| JP | H09281000 A | 10/1997 |

(Continued)

*Primary Examiner* — Nathaniel T Woodward
*Assistant Examiner* — Philip L Cotey

(57) ABSTRACT

Systems and methods for determining temperature or temperature related variables using a sensor having a measurement surface include a sensor body having one or more walls and containing an intermediary material, a window providing a measurement surface, a first temperature sensor obtaining a first temperature at or near the window, a second temperature sensor located within the intermediary material, and a processor configured to receive the first temperature and the second temperature and determine a temperature adjustment based on those temperatures. The temperature adjustment can be used to adjust a value of a temperature related variable based on the temperature at the measurement surface, for example for calculating a refractive index of a fluid. Additional temperature sensors may be included and further included in the determination of the temperature adjustment.

19 Claims, 4 Drawing Sheets

(56) References Cited

U.S. PATENT DOCUMENTS

| | | | | |
|---|---|---|---|---|
| 7,494,265 | B2* | 2/2009 | Niermeyer | G05D 23/1393 |
| | | | | 366/160.1 |
| 9,340,878 | B2* | 5/2016 | Arno | C23C 16/455 |
| 10,371,624 | B2* | 8/2019 | Balchunas | G01N 21/0332 |
| 2002/0018200 | A1* | 2/2002 | Salo | G01N 21/431 |
| | | | | 356/128 |
| 2005/0213080 | A1* | 9/2005 | Huang | G01N 21/4133 |
| | | | | 356/128 |
| 2007/0070332 | A1* | 3/2007 | Chiarello | G01N 21/4133 |
| | | | | 356/136 |
| 2016/0320252 | A1* | 11/2016 | Ostermeyer | G01N 21/43 |
| 2017/0074730 | A1* | 3/2017 | Rieder | G01K 7/427 |
| 2017/0212065 | A1* | 7/2017 | Rud | G01K 7/427 |
| 2018/0172582 | A1* | 6/2018 | Leinonen | G01N 15/06 |
| 2018/0299368 | A1* | 10/2018 | Balchunas | G01N 21/4133 |
| 2020/0072773 | A1* | 3/2020 | Hammerschmidt | G01N 25/18 |
| 2020/0408580 | A1* | 12/2020 | Gebhardt | G01K 13/02 |

FOREIGN PATENT DOCUMENTS

| | | | |
|---|---|---|---|
| JP | 2003090793 | A | 3/2003 |
| TW | 201350826 | A | 12/2013 |
| WO | 03060492 | W | 7/2003 |

\* cited by examiner

ACCURATE TEMPERATURE READING OF FLUID NEAR INTERFACE

CROSS-REFERENCE TO RELATED APPLICATION

This application claims the benefit of and priority to U.S. Provisional Application No. 62/951,474, filed on Dec. 20, 2019, which is incorporated herein by reference in its entirety

FIELD

This disclosure is directed to measurement and estimation of a temperature at a measurement surface, particularly to determine a value of a temperature-variable property.

BACKGROUND

Optical sensors may be used to determine properties or condition of a material, such as temperature, refractive index, and the like. In some applications, the properties, such as refractive index, may be used to compute or determine further characteristics such as the composition or concentration of a fluid, or other such values related to the measured property. Some of these conditions or properties may be at least partially variable based on temperature.

Optical sensors may be used to measure a variety of properties of compounds, such as, for example, fluids. The fluids may be flowing past the optical sensor. Measurements by the optical sensor are made at a measurement surface which is typically at an edge of the flow as opposed to being within the bulk of the flow.

SUMMARY

This disclosure is directed to measurement and estimation of a temperature at a measurement surface, particularly to determine a value of a temperature-variable property.

For measurements taken at a measurement surface, such as on one side of a window that is outside of a refractive index sensor, temperature can be estimated using temperature measurements within the sensor. By estimating the temperature at the measurement surface, any temperature adjustments to the measurement are more stable and more accurate compared to adjustments based off of, for example, the bulk temperature or using a single temperature value from a sensor, which can vary with ambient temperatures of the sensor. Embodiments may be applied to temperature-variable properties including, but not limited to, temperature itself; other temperature-variable properties such as, but not limited to, an extrapolated refractive index; or values based off of such temperature-variable properties such as, but not limited to, estimates of the composition of a fluid based on an extrapolated refractive index at a reference temperature.

In an embodiment, a refractive index sensor includes a sensor module body including one or more walls defining an internal space, a window, and an optical refractive index sensor located within the sensor module body. The optical refractive index sensor is configured to measure refractive index. An intermediary material is located within the internal space and in contact with the window. A first temperature sensor is located within the intermediary material at a first position. A second temperature sensor is located within the intermediary material at a second position. The second position is farther from the window than the first position. A processor is configured to receive a first temperature from the first temperature sensor and to receive a second temperature from the second temperature sensor. The processor is further configured to determine a temperature adjustment as a function of the first temperature and the second temperature and adjust an extrapolated refractive index value from the optical refractive index sensor based on the temperature adjustment.

In an embodiment, the refractive index sensor includes a third temperature sensor located within the intermediary material at a third position that is separated from the first and second positions. The processor is configured to receive a third temperature from the third temperature sensor. The temperature adjustment is a function of the first temperature, the second temperature, and the third temperature.

In an embodiment, the intermediary material has a thermal conductivity that is greater than a thermal conductivity of the one or more walls.

In an embodiment, the processor is included on a circuit board that is separate from the intermediary material.

In an embodiment, the first temperature sensor contacts the window.

In an embodiment, the first temperature sensor is fixed to the window by a temperature-conductive adhesive.

In an embodiment, the function of the first temperature and the second temperature is a linear function.

In an embodiment, the sensor module body includes one or more walls defining the internal space.

In an embodiment, a method of temperature compensation in a sensor includes obtaining a temperature-variable property at a measurement surface, obtaining a first temperature at a first position within the sensor, and obtaining a second temperature at a second position within the sensor. The second position is farther from the measurement surface than the first position. The method further includes determining a temperature adjustment as a function of the first temperature and the second temperature, and adjusting the measured temperature-variable property based on the determined temperature adjustment. The first position within the sensor and the second position within the sensor are separated by an intermediary material.

In an embodiment, the measurement surface is at a window of the sensor.

In an embodiment, the function of the first temperature and the second temperature is a linear function of the difference between the first and second temperatures.

In an embodiment, the temperature-variable property is an extrapolated refractive index.

In an embodiment, the function of the first temperature and the second temperature is determined by a calibration process including providing a flow of a reference fluid over the measurement surface at a predetermined temperature, obtaining the first temperature, obtaining the second temperature, and selecting values for one or more constants in the function such that the temperature adjustment corresponds to the predetermined temperature.

In an embodiment, the method further includes obtaining a third temperature at a third position within the sensor. The third position is separated from the first position and the second position. The temperature adjustment is a function of the first temperature, the second temperature, and the third temperature.

A sensor module embodiment includes a sensor module body, including one or more walls defining an internal space, a window, and an optical sensor located within the sensor module body. The optical sensor is configured to measure a temperature-variable property. An intermediary material is located within the internal space and in contact with the window. A first temperature sensor is located within the intermediary material at a first position. A second temperature sensor is located within the intermediary material at a second position. The second position is farther from the window than the first position. A processor is configured to receive a first temperature from the first temperature sensor, receive a second temperature from the second temperature sensor, and determine a temperature adjustment as a function of the first temperature and the second temperature.

In an embodiment, the temperature-variable property is a refractive index.

In an embodiment, the sensor module further includes a third temperature sensor located within the intermediary material at a third position that is separated from the first and second position. The processor is configured to receive a third temperature from the third temperature sensor. The temperature adjustment is a function of the first temperature, the second temperature, and the third temperature.

In an embodiment, the processor is further configured to adjust the refractive index based on the temperature adjustment.

In an embodiment, the processor is included on a circuit board that is separate from the intermediary material.

In an embodiment, the function of the first temperature and the second temperature is a linear function.

An embodiment is a method for determining a temperature at a first surface of an object, the object having a second surface opposite the first. The method includes obtaining a first temperature at the second surface. The method further includes obtaining a second temperature at a position spaced apart from the second surface, the position separated from the second surface by an intermediary material having a fixed thermal conductivity. The method also includes determining the temperature at the first surface of the object as a function of the first temperature and the second temperature.

In an embodiment, the object is a window of an optical sensor.

In an embodiment, the function of the first temperature and the second temperature is a linear function.

In an embodiment, the function of the first temperature and the second temperature is determined by a calibration process. The calibration process includes providing a flow of a reference fluid over the first surface at a predetermined temperature, obtaining the first temperature, and obtaining the second temperature. The method further includes selecting values for one or more constants in the function such that the temperature adjustment corresponds to the predetermined temperature.

In an embodiment, the method further includes obtaining a third temperature at second position, spaced apart from the second surface and the position where the second temperature is obtained.

DRAWINGS

The disclosure may be more completely understood in consideration of the following description of various illustrative embodiments in connection with the accompanying drawings.

Figure 1:
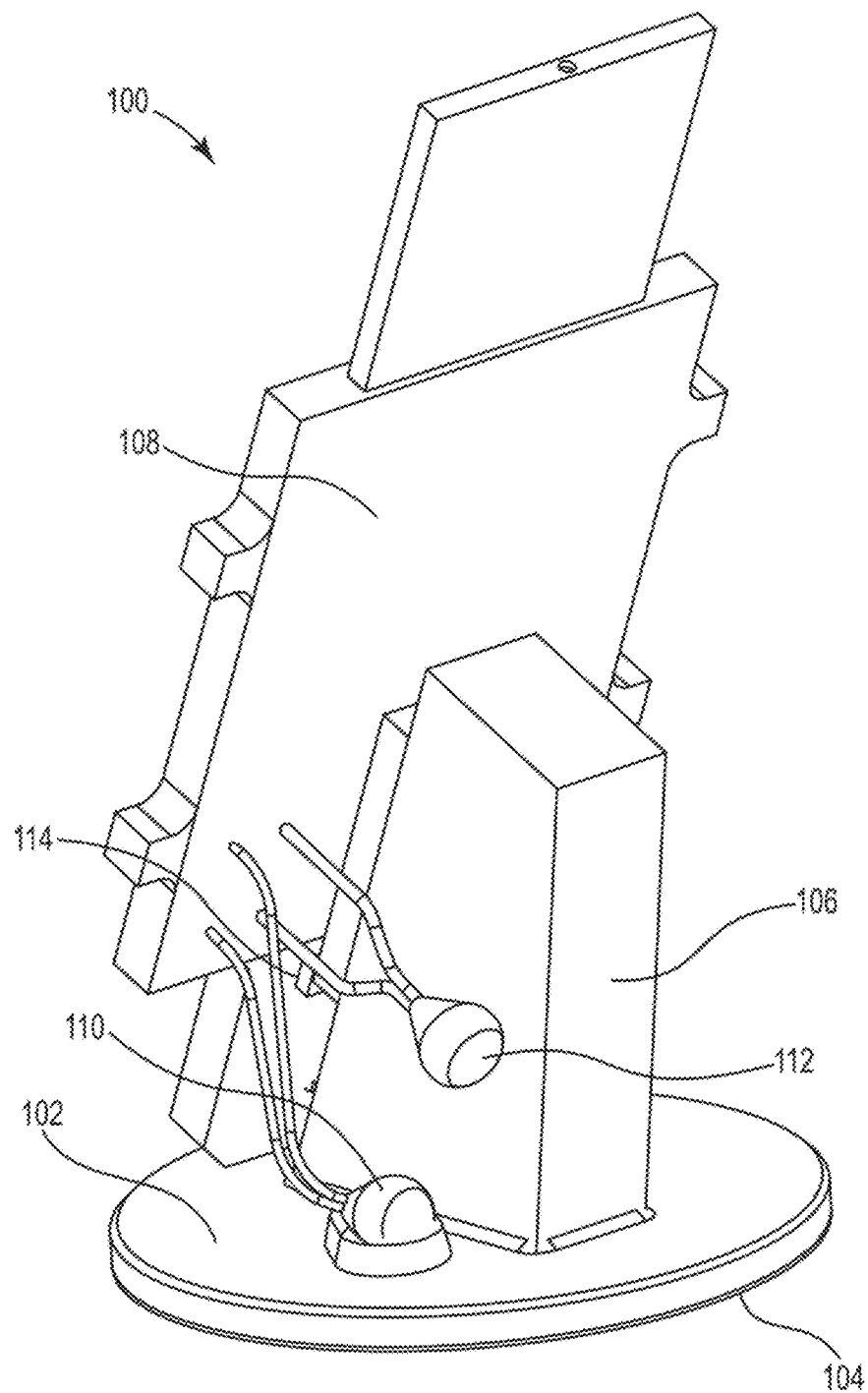
FIG. 1 shows a sensor module according to an embodiment.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DETAILED DESCRIPTION

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The term "about" generally refers to a range of numbers that is considered equivalent to the recited value (e.g., having the same function or result). In many instances, the term "about" may include numbers that are rounded to the nearest significant figure.

Numerical ranges expressed using endpoints include all numbers subsumed within that range (e.g. 1 to 5 includes 1, 1.5, 2, 2.75, 3, 3.80, 4 and 5).

The following detailed description should be read with reference to the drawings in which similar elements in different drawings are numbered the same. The detailed description and the drawings, which are not necessarily to scale, depict illustrative embodiments and are not intended to limit the scope of the invention. The illustrative embodiments depicted are intended only as exemplary. Selected features of any illustrative embodiment may be incorporated into an additional embodiment unless clearly stated to the contrary.

"Controller," as used herein, refers to one or more processors configured to receive data, process data, provide data, or suitable combinations thereof.

"Extrapolated refractive index," as used herein, refers to the refractive index of a measured substance, adjusted to represent the refractive index at a reference temperature.

"Intermediary material," as used herein, refers to any material used to fill a sensor body, such as, for example, potting materials.

"Sensor," as used herein, refers to any measurement device measuring a temperature, a temperature-variable property, or suitable combination thereof.

"Temperature sensor" as used herein refers to any measurement device configured to obtain a temperature at the sensor. The temperature sensor can be, as non-limiting examples, a thermistor, a thermocouple, a semiconductor-based sensor, or the like.

"Temperature-variable property," as used herein, refers to a property that will vary with temperature. Temperature-variable properties can be properties inherent to a material and that result in different measured values as temperature is varied. Non-limiting examples of temperature-variable properties can include temperature, extrapolated refractive index, or a value derived from a property that is measured at the measurement surface, such as a concentration that is determined based on an extrapolated refractive index measurement and the like.

FIG. 1 shows a sensor module 100 according to an embodiment. Sensor module 100 may be used to measure a temperature-variable property.

Sensor module 100 includes window 102. A first side of window 102 is measurement surface 104. Transducer 106 is on a second side of window 102 that is opposite measurement surface 104. Controller 108 is connected to transducer 106. A first temperature sensor 110 is connected to controller 108 at or near window 102. A second temperature sensor 112 is also connected to controller 108 such that it is at a position separate from the position of the first temperature sensor 110.

In the embodiment shown in FIG. 1, a third temperature sensor 114 is also connected to controller 108 such that it is in a third position that is separate from the positions of first temperature sensor 110 and second temperature sensor 112. The components shown in FIG. 1 may be placed within a sensor body, such as being included in sensor module 300 shown in FIG. 3 and described below. The sensor body may be filled with an intermediary material. Sensor module 100 may be configured to be placed in a flow channel such that the window faces a fluid path within the flow channel.

Window 102 is a portion of sensor module 100 configured to interface with a fluid having properties that are measured by sensor module 100. Window 102 may be translucent or transparent at a measurement wavelength so that light is transmissible therethrough at a selected wavelength. Window 102 has a fixed thermal conductance. In an embodiment, the window 102 is formed from sapphire. In an embodiment, window 102 may include glass. In an embodiment, window 102 may include silica.

Measurement surface 104 is a surface of window 102 facing away from the other components of sensor module 100 and towards the fluid that is having a property measured by sensor module 100. In an embodiment, when sensor module 100 is included in a flow cell such as that shown in FIG. 3, measurement surface 104 is at the contact between sensor module 100 and flow of a fluid such as a gas or liquid through the flow cell.

Transducer 106 is operatively connected to controller 108 such that it can transmit a signal corresponding to the measured temperature-variable property to controller 108. Transducer 106 is a transducer generating a signal based on a temperature-variable property, such as temperature, refractive index, or other properties that change as a function of temperature. Transducer 106 may be, for example, an optical sensor. In an embodiment, transducer 106 is an optical refractive index sensor. In an embodiment, transducer 106 includes a prism. In an embodiment, the prism contacts a side of window 102 opposite measurement surface 104. In an embodiment, the prism is included in a total internal reflection sensor such as a refractive index sensor including photodetectors, so that internal reflectance within the prism can be measured as the measurement surface 104 is brought into contact with a subject to be measured.

Controller 108 is a controller configured to receive a signal from transducer 106 and output a measurement made by sensor module 100, including a temperature adjustment. The measurement may be, for example, a temperature, an extrapolated refractive index, a value based on an extrapolated refractive index such as a concentration, or combinations thereof. Controller 108 is operatively connected to first temperature sensor 110, second temperature sensor 112, and any further temperature sensors within the sensor module 100 such as optional third temperature sensor 114, such that controller 108 receives temperature readings from those temperature sensors.

The controller 108 is configured to determine a temperature adjustment based on temperature readings from the temperature sensors including at least first temperature sensor 110 and second temperature sensor 112. The temperature adjustment may be reflective of the temperature at the window 102, particularly at the measurement surface 104. The temperature adjustment may be used to correct for the effect of ambient temperatures on the sensor module 100 or a flow cell within which a property is measured by sensor module 100. The temperature adjustment may be used to correct for differences in temperature between a bulk flow through a flow cell including measurement surface 104 and a temperature at or nearest to the measurement surface 104 of window 102. The temperature adjustment may be used to correct a value to a reference condition for use in subsequent derivations of the property to be output by the sensor module 100. For example, the temperature adjustment may be used for adjusting an extrapolated refractive index so that it may be used to determine a concentration. The temperature adjustment may be determined based on extrapolation of the temperature at measurement surface 104, based on readings from temperature sensors including first temperature sensor 110 and second temperature sensor 112 and thermal conductivity of components of sensor module 100. In an embodiment, the extrapolation is based on a linear function based on the thermal conductivity of an intermediary material within sensor module 100 and between first temperature sensor 110 and second temperature sensor 112.

First temperature sensor 110 is a temperature sensor at or near window 102. First temperature sensor 110 obtains a temperature at its position within sensor module 100 and that temperature is communicated to the controller 108. In an embodiment, first temperature sensor 110 is in contact with window 102 on a side opposite measurement surface 104. In an embodiment, first temperature sensor 110 is fixed to window 102 via an adhesive. In an embodiment, the adhesive is thermally conductive. First temperature sensor 110 may be any suitable type of temperature sensor for reading a temperature at or near the window 102, such as, for example, a thermistor, a thermocouple, or a semiconductor-based temperature sensor. In an embodiment, first temperature sensor 110 includes a thermistor.

Second temperature sensor 112 is another temperature sensor located within the body of sensor module 100. Second temperature sensor 112 is located at a second position, different from the position of first temperature sensor 110. Second temperature sensor 112 may be positioned farther from window 102 than first temperature sensor 110. Second temperature sensor may be located in an intermediary material located within sensor module 100, may include a potting material, for example a thermoset plastic or a silicone rubber gel. In an embodiment, second temperature sensor 112 includes a thermistor. Second temperature sensor 112 obtains the temperature at the second position and provides that temperature to the controller 108.

Third temperature sensor 114 is an optional component that is included in the embodiment shown in FIG. 1. Third temperature sensor 114 is a temperature sensor that detects and reports a temperature value at the position of the third temperature sensor 114. The third temperature sensor 114 may be any suitable temperature sensor such as, for example, a thermistor or thermocouple. In an embodiment, third temperature sensor 114 may be along a line defined by first temperature sensor 110 and second temperature sensor 112. In an embodiment, third temperature sensor 114 may be farther from window 102 than both first temperature sensor 110 and second temperature sensor 112. Further temperature sensors may also be included in a sensor such as sensor module 100, located at other points separate from other temperature sensors and connected to the controller 108. The third temperature sensor 114 and any further optional temperature sensors obtain temperatures at their respective positions within sensor module 100 and those temperatures may be communicated to controller 108.

The sensor module 100 may be installed in a sensor body which is filled with an intermediary material. The intermediary material may be a material with a fixed thermal conductivity. The intermediary material may have a thermal conductivity that is similar to the thermal conductivity of the window. The first temperature sensor 110, second temperature sensor 112, and third temperature sensor 114 may be separated from one another by the intermediary material. In an embodiment, the intermediary material is a potting material.

Figure 2:
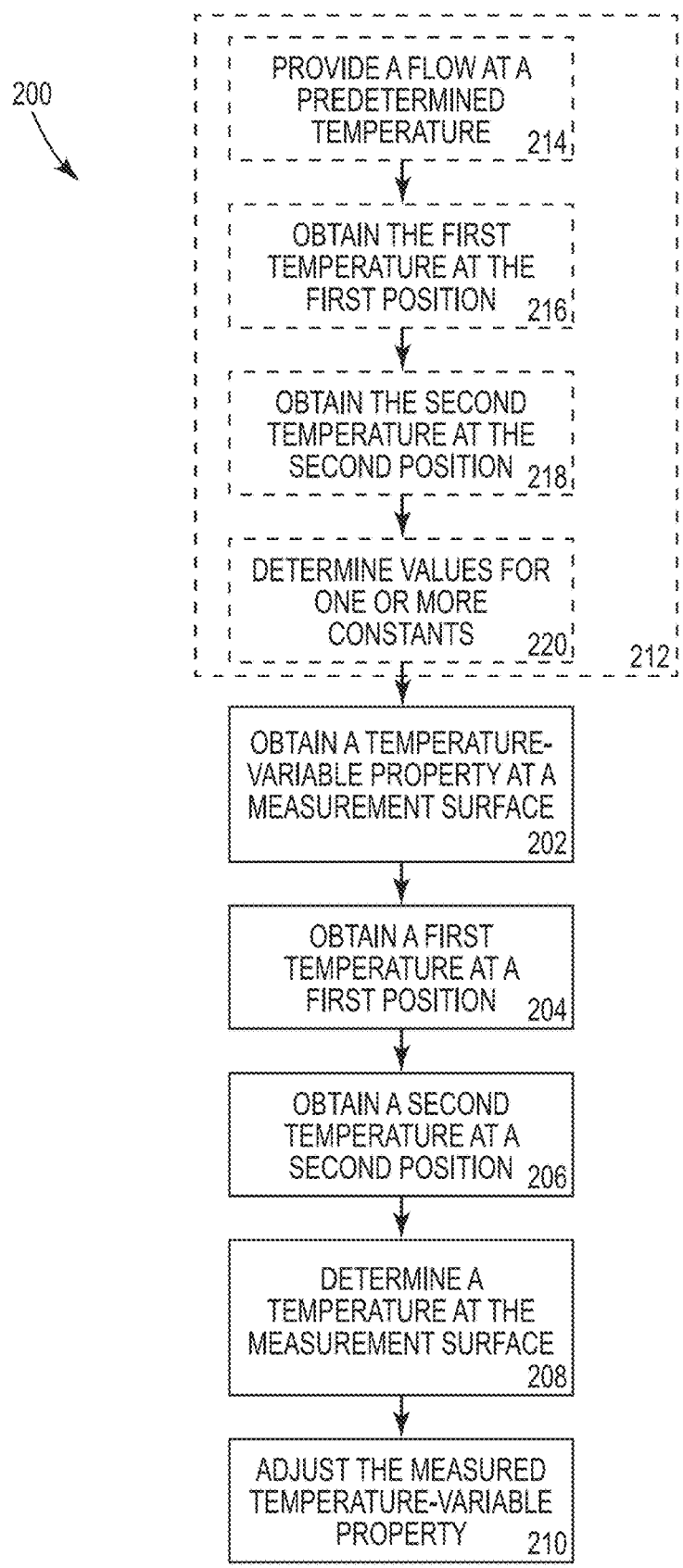
FIG. 2 shows a flowchart of a method according to an embodiment.

FIG. 2 shows a flowchart of a method 200 according to an embodiment. Method 200 includes obtaining a temperature-variable property at a measurement surface 202, obtaining a first temperature at a first position within the sensor 204, obtaining a second temperature at a second temperature within the sensor 206, determining a temperature at the measurement surface 208, and adjusting the measured temperature-variable property based on the determined temperature 210.

Obtaining a temperature-variable property at a measurement surface 202 includes taking a measurement at the measurement surface, for example via a transducer included in the sensor. The temperature-variable property may be, for example, temperature, extrapolated refractive index, or a value derived from a property that is measured at the measurement surface, such as a concentration that is determined based on an extrapolated refractive index measurement. In an embodiment, the refractive index is measured via an optical sensor. In an embodiment, the optical sensor includes a prism. In an embodiment, the optical sensor is a total internal reflectance sensor.

A first temperature at a first position within the sensor is obtained at 204. The first temperature may be obtained via a first temperature sensor located at the first position. The first position may be at or near the window of the sensor that includes the measurement surface. The first temperature sensor may be attached to the window, for example via a thermally conductive adhesive. In an embodiment, the first temperature sensor includes a thermistor.

A second temperature at a second temperature within the sensor is obtained at 206. The second temperature may be obtained via a second temperature sensor located at a second position. In an embodiment, the second temperature sensor includes a thermistor. The second position is separate from the first position where a temperature is obtained at 204. In an embodiment, an intermediary material separates the second temperature sensor from the first temperature sensor. In an embodiment, the intermediary material is a potting material. In an embodiment, a distance between the first position and the second position is a predetermined value. In an embodiment, the second position is further from the window of the sensor than the first position.

The temperature at the measurement surface is determined at 208. The temperature adjustment is based at least in part on the first temperature obtained at 204 and the second temperature obtained at 206. The temperature adjustment may further be based on additional temperatures obtained from other positions within the sensor. The other positions may be separate from the first and second positions. The other positions may be separated from the first and second positions by an intermediary material such as a potting material. The temperature adjustment may further be based on the distance between the positions at which the temperature readings are obtained within the sensor. The temperature adjustment may further be based on the thermal conductivity of the intermediary material, the thermal conductivity of the window material, or combinations thereof.

The temperature determined at 208 may be reflective of the temperature at the window where the temperature-variable property is obtained at 202. In an embodiment, the temperature adjustment is an extrapolation of the temperature at the measurement surface of the window of the sensor. In an embodiment, the approximation is made based on linear extrapolation. In an embodiment, the extrapolation is a function of the temperatures obtained within the sensor and the thermal conductivity of the intermediary material. In an embodiment, the function used to approximate the temperature at the measurement surface is a linear function based on a difference between the first temperature obtained at 204 and the second temperature obtained at 206.

The measured temperature-variable property is adjusted based on the temperature determined at 210. In an embodiment where the temperature-variable property includes a temperature measurement, the temperature measurement may be adjusted to be the temperature adjustment determined at 208. In an embodiment where the temperature-variable property is a temperature-variable property other than temperature itself, the value may be adjusted to a nominal value based on the relationship between the temperature and the temperature-variable property. In an embodiment, the adjustment to the nominal value may be based on a function of the relationship between the temperature and the temperature-variable property. In an embodiment, the adjustment to the nominal value may be via referencing stored data regarding the relationship between the temperature and the temperature-variable property, such as a lookup table correlating temperature at the measurement surface and adjustments to be made to the measured temperature-variable property. In an embodiment, the adjustment to the nominal value may be based on a matrix. In an embodiment, the adjustment to the nominal value may be based on a linear equation. In an embodiment, the adjustment to the nominal value may be based on a second order equation.

Determining the temperature at the measurement surface 208 may optionally be based on calibration 212. Calibration 212 may include providing a flow over the measurement surface at a predetermined temperature 214, obtaining the first temperature 216, obtaining the second temperature 218, and selecting values for one or more constants in a function used to determine the measurement surface temperature 220.

Calibration 212 includes providing a flow over the measurement surface at a predetermined temperature 214. The flow provided at 214 may be of a material with a high thermal conductivity, such that the temperature at the measurement surface is close to the temperature of the bulk flow which is provided at the predetermined temperature. The flow provided at 214 may be provided at a fixed viscosity, velocity, flow rate, or suitable combinations thereof.

The first temperature is obtained at 216 and the second temperature is obtained at 218 while the flow is provided at 214. The first temperature is obtained at the first position as described in 204. The second temperature is obtained in the second position as described in 206. If the sensor obtains additional temperatures and uses them when determining the temperature at the measurement surface at 208, these temperatures may also be obtained.

Once the temperatures are obtained under the flow provided at 214, values for one or more constants in a function used to determine the measurement surface temperature are selected at 220. The selection of values 220 may be performed by inputting the obtained temperature values into the function that will used to determine the temperature at the measurement surface at 208, and determining the values for the constants that would result in the function outputting the predetermined temperature of the flow provided in 214. In an embodiment, the constants are constants of a linear function. The calibration 212 may be performed at a predetermined, fixed ambient temperature. The selecting of values at 220 may be further based on the predetermined, fixed ambient temperature. In an embodiment, instead of providing a flow at 214, the calibration at 212 may include contacting the window with a thermally conductive solid at a predetermined temperature. The calibration 212 may then proceed to obtaining the first and second temperatures 216, 218, and determining the values for one of more constants at 220.

Figure 3:
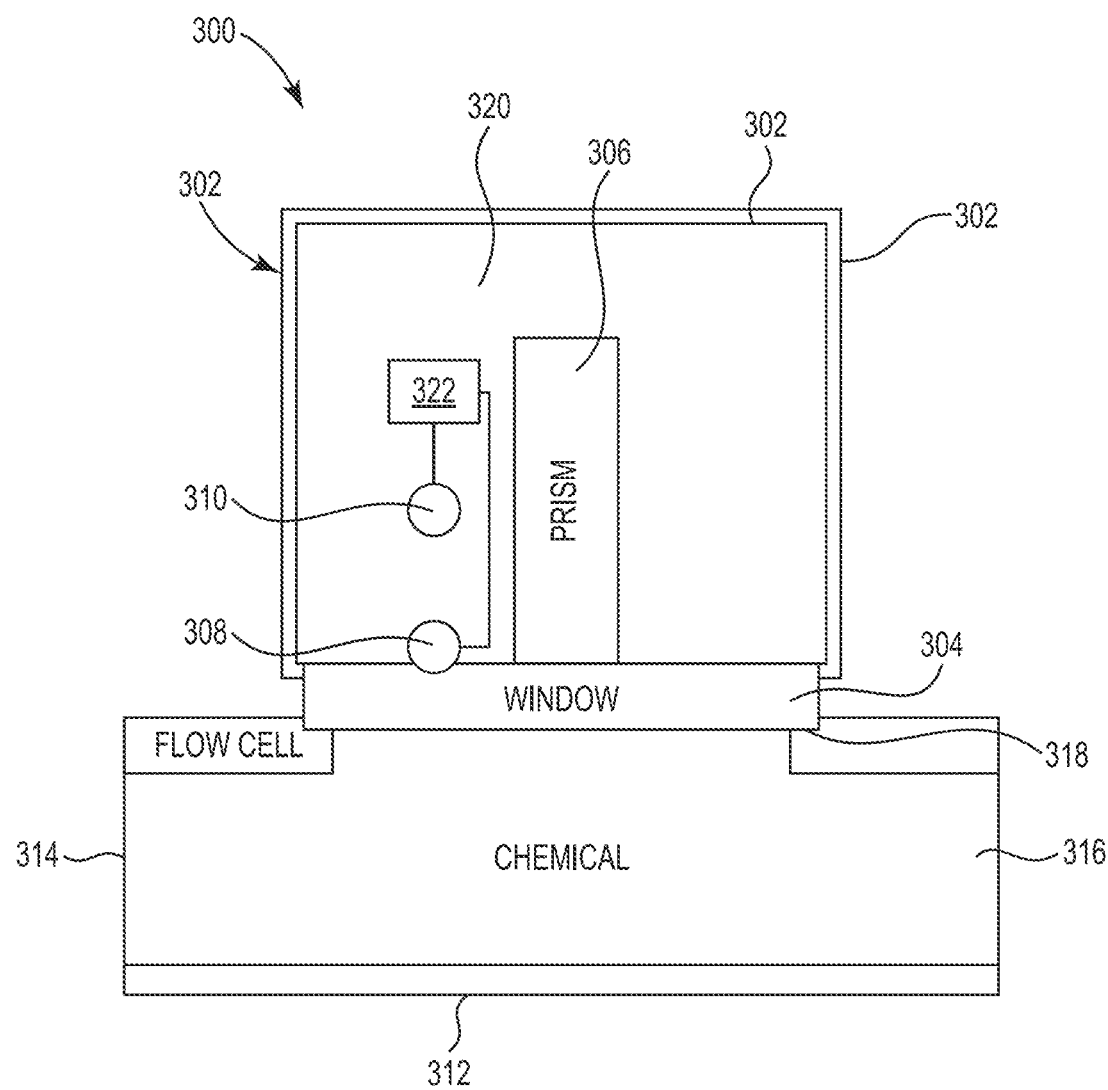
FIG. 3 shows a schematic of a sensor module installed in a flow cell according to an embodiment.

FIG. 3 shows a schematic of a sensor module 300 installed in a flow cell 312 according to an embodiment. Sensor module 300 includes one or more walls 302, window 304, sensor 306, first temperature sensor 308 and second temperature 310. Intermediary material 320 fills the space defined by walls 302 and surrounds the sensor 306, the first temperature sensor 308, and second temperature sensor 310. Sensor module 300 is joined to flow cell 312, which includes inlet 314 and outlet 316.

The one or more walls 302 define, at least in part, an internal space of the sensor module 300. Walls 302 can include one or more side walls of the sensor module 300. In an embodiment, walls 302 includes a plurality of side walls. Optionally, walls 302 may further include a top wall. The internal space defined by walls 302 may contain an intermediary material 320. In an embodiment, the intermediary material 320 is a potting material. In an embodiment, the intermediary material 320 has a fixed thermal conductivity. Walls 302 may have a low thermal conductivity and thus limit or reduce heat flux into the internal space. Walls 302 may extend perpendicular to a surface including window 304. Walls 302 may extend away from flow cell 312 to which the sensor module 300 is joined.

Window 304 is a portion of sensor module 300 configured to interface with flow of a fluid through the flow cell 312. Window 304 may be translucent or transparent. In an embodiment, the window 304 is formed from sapphire. In an embodiment, window 304 may include glass. In an embodiment, window 304 may include silica. Window 304 includes a measurement surface 318. The measurement surface 318 of window 304 is the side of window 304 facing away from the other components of sensor module 300 and towards the interior of flow cell 312.

Sensor 306 is a sensor located within sensor module 300 that measures a temperature-variable property such as temperature, extrapolated refractive index, or other such properties that change as a function of temperature. Sensor 306 may include a transducer and a controller 322 connected to the transducer. The transducer included in sensor 306 may be, for example, an optical sensor. In an embodiment, the transducer is an optical refractive index sensor. In an embodiment, the transducer includes a prism. In an embodiment, the prism contacts a side of window 304 opposite the measurement surface 318 and facing the internal space of sensor module 300. In an embodiment, the prism is included in a total internal reflection sensor.

The controller 322 included in sensor 306 may be operatively connected such that it may receive input from at least the transducer, the first temperature sensor 308, and the second temperature sensor 310, and output a value for the temperature-variable property measured by the sensor 306. The controller 322 is configured to determine a temperature adjustment based on temperature readings from the temperature sensors including at least first temperature sensor 308 and second temperature sensor 310 and apply the temperature adjustment to the value for the temperature-variable property that is output by sensor 306. The controller 322 may further be configured to receive additional temperatures from within the sensor module 300 and the additional temperatures may also be included in the determination of an adjusted value for the temperature-variable property. The temperature adjustment may be reflective of the temperature at the window 304, particularly at the measurement surface 318. The temperature adjustment may be used to correct for ambient temperatures of the sensor module 300 and flow cell 312. The temperature adjustment may be used to correct for differences in temperature between a bulk flow through flow cell 312 and a temperature at or nearest to the measurement surface 318 of window 304. The temperature adjustment may be used to correct a value to a reference condition for use in subsequent derivations of the property to be output by the sensor, for example adjusting an extrapolated refractive index so that it may be used to determine, for example, a concentration or a purity of fluid flowing through flow cell 312. The temperature adjustment may be determined based on extrapolation of the temperature at the measurement surface 318 of window 304, based on readings from temperature sensors including first temperature sensor 308 and second temperature sensor 310 and thermal conductivity of components within sensor module 300. In an embodiment, the extrapolation is based on a linear function based on the thermal conductivity of an intermediary material 320 and the difference between a temperature at first temperature sensor 308 and a temperature at second temperature sensor 310.

First temperature sensor 308 is a temperature sensor at or near window 304 and located within sensor module 300. First temperature sensor 308 obtains a temperature at its position within sensor module 300 and that temperature is communicated to the controller 322. In an embodiment, first temperature sensor 308 is in contact with window 304 on a side opposite the measurement surface 318. In an embodiment, first temperature sensor 308 is fixed to window 304 via an adhesive. In an embodiment, the adhesive is thermally conductive. First temperature sensor 308 may be any suitable type of temperature sensor for reading a temperature. In an embodiment, first temperature sensor 308 includes a thermistor.

Second temperature sensor 310 is another temperature sensor located within the body of sensor module 300. Second temperature sensor 310 is located at a second position, different from the position of first temperature sensor 308. Second temperature sensor 310 may be positioned further from window 304 than first temperature sensor 308. Second temperature sensor may be located in an intermediary material 320 located within the internal space defined at least in part by walls 302. In an embodiment, the intermediary material 320 as a potting material. In an embodiment, second temperature sensor 310 includes a thermistor. Second temperature sensor 310 obtains the temperature at the second position and provides that temperature to the controller 322 included in sensor 308.

Flow cell 312 provides a path for flow of a fluid over and past window 304 of sensor module 300. Flow cell 312 includes an inlet 314 and an outlet 316. Flow cell 312 includes an internal space providing a flow path extending from inlet 314 to outlet 316. Flow cell 312 may be joined to sensor module 300 such that the measurement surface 318 of window 304 is in contact with the internal space within flow cell 312 and along the flow path. Inlet 314 is an aperture in flow cell 312 allowing fluid to enter the flow path extending through flow cell 312 to outlet 316. Outlet 316 is at an end of the flow path through flow cell 312 that is opposite the end of the flow path where inlet 314 is located.

Figure 4:
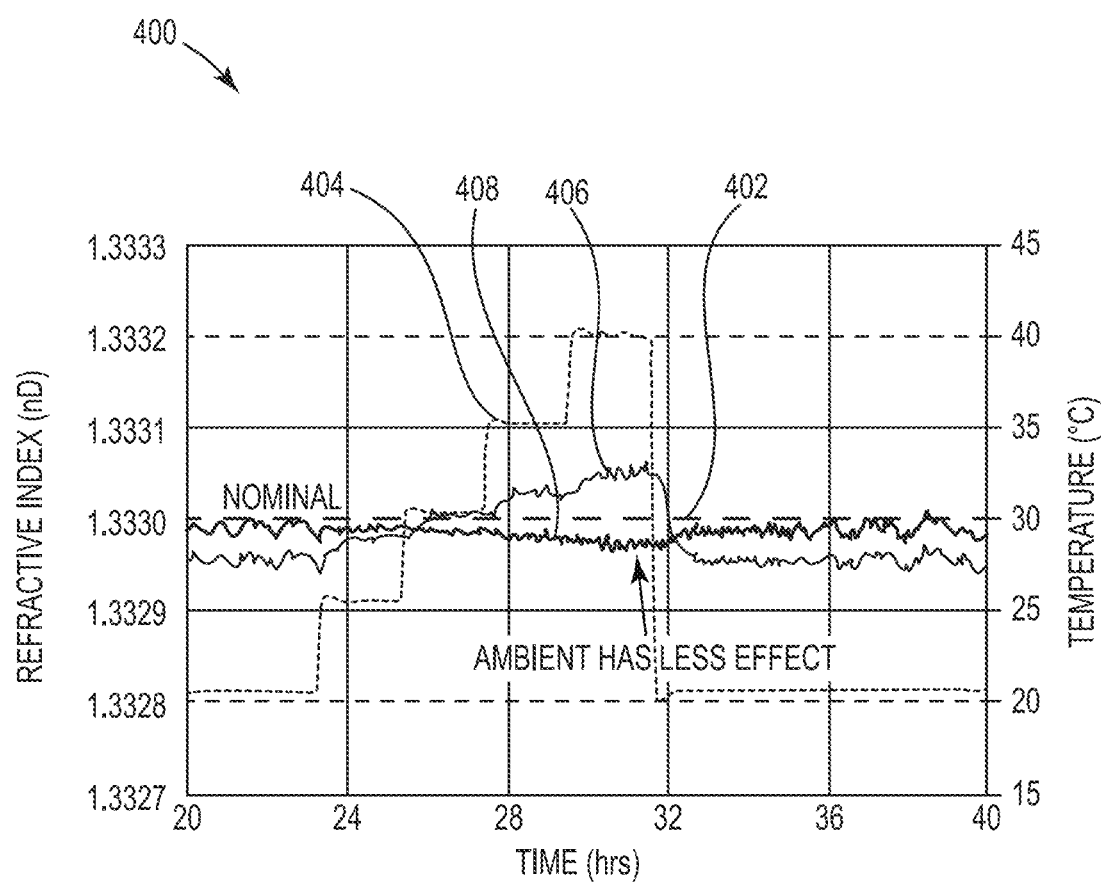
FIG. 4 shows an extrapolated refractive index from a sensor at different temperatures with respect to a nominal refractive index value with and without correction according to an embodiment.

FIG. 4 shows extrapolated refractive index results from a refractive index sensor at different temperatures with respect to a nominal refractive index value, with and without correction according to an embodiment. In the example shown in FIG. 4, the correction is a second order extrapolation of the refractive index at a reference temperature of 20° C., based on the variance of the refractive index of the fluid with temperature. The fluid used was deionized water at 30° C. Ambient temperature was controlled to be at 20° C., 25° C., 30° C., 35° C., 40° C., and then returning to 20° C. over the trial. The refractive index of deionized water at the reference temperature of 20° C. is 1.3330 nD.

The results in FIG. 4 are presented on chart 400. Chart 400 includes nominal refractive index line 402, which is the refractive index of the test fluid at the reference temperature, i.e. 1.3330 nD; temperature line 404, which shows the ambient temperature of the sensor as it is varied during the trial; uncorrected extrapolated refractive index 406, which shows the output of an extrapolated refractive index sensor without temperature compensation according to this disclosure; and corrected extrapolated refractive index 408, where the sensor includes two temperature sensors and determines the temperature at the measurement surface and the temperature is used for the second order extrapolation of the refractive index to correct the refractive index value as the ambient temperature varies.

As can be seen in chart 400, uncorrected extrapolated refractive index 406 includes significant deviations corresponding to changes in the ambient temperature visible in temperature line 404. In comparison to uncorrected extrapolated refractive index 406, the corrected extrapolated refractive index 408, remains much closer to the nominal refractive index line 402, even as the ambient temperature varies as shown in temperature line 404, indicating the improved accuracy of the corrected extrapolated refractive index 408. The corrected extrapolated refractive index 408 can have an improvement in accuracy of up to 85% compared to the uncorrected extrapolated refractive index 406.

By providing a value closer to the nominal refractive index, refractive indices provided by a sensor using temperature correction can provide improved accuracy for determination of related values, such as concentration or purity values that are computed based on the nominal refractive index of the fluid. Such improvements also would correspondingly improve other measures of temperature-sensitive variables and correction of those measurements for factors such as ambient temperatures or differences between temperatures at the measurement surface versus the temperature within the bulk flow of the fluid.

Aspects:

It is understood that any of aspects 1-7 can be combined with any of aspects 8-13, 14-19, or 20-24. It is understood that any of aspects 8-13 may be combined with any of aspects 14-19 or 20-24. It is understood that any of aspects 14-19 may be combined with any of aspects 20-24.

Aspect 1. A refractive index sensor, comprising:
a sensor module body, including one or more walls defining an internal space;
a window;
an optical refractive index sensor located within the sensor module body, the optical refractive index sensor configured to measure refractive index;
an intermediary material located within the internal space and in contact with the window;
a first temperature sensor located within the intermediary material at a first position;
a second temperature sensor located within the intermediary material at a second position, the second position being farther from the window than the first position; and
a processor configured to:
receive a first temperature from the first temperature sensor;
receive a second temperature from the second temperature sensor; and
determine a temperature adjustment as a function of the first temperature and the second temperature; and
adjust an extrapolated refractive index value from the optical refractive index sensor based on the temperature adjustment.

Aspect 2. The refractive index sensor according to aspect 1, further comprising a third temperature sensor located within the intermediary material at a third position, that is separated from the first and second positions, wherein the processor is configured to receive a third temperature from the third temperature sensor, and the temperature adjustment is a function of the first temperature, the second temperature, and the third temperature.

Aspect 3. The refractive index sensor according to any of aspects 1-2, wherein the intermediary material has a thermal conductivity that is greater than a thermal conductivity of the one or more walls.

Aspect 4. The refractive index sensor according to any of aspects 1-3, wherein the processor is included on a circuit board that is separate from the intermediary material.

Aspect 5. The refractive index sensor according to any of aspects 1-4, wherein the first temperature sensor contacts the window.

Aspect 6. The refractive index sensor according to any of aspects 1-5, wherein the first temperature sensor is fixed to the window by a temperature-conductive adhesive.

Aspect 7. The refractive index sensor according to any of aspects 1-6, wherein the function of the first temperature and the second temperature is a linear function.

Aspect 8. A method of temperature compensation in a sensor, comprising:
obtaining a temperature-variable property at a measurement surface;
obtaining a first temperature at a first position within the sensor;
obtaining a second temperature at a second position within the sensor, the second position being farther from the measurement surface than the first position;
determining a temperature adjustment as a function of the first temperature and the second temperature; and
adjusting the measured temperature-variable property based on the determined temperature adjustment,
wherein the first position within the sensor and the second position within the sensor are separated by an intermediary material.

Aspect 9. The method according to aspect 8, wherein the measurement surface is at a window of the sensor.

Aspect 10. The method according to any of aspects 8-9, wherein the function of the first temperature and the second temperature is a linear function.

Aspect 11. The method according to any of aspects 8-10, wherein the temperature-variable property is a refractive index.

Aspect 12. The method according to any of aspects 8-11, wherein the function of the first temperature and the second temperature is determined by a calibration process including: providing a flow of a reference fluid over the measurement surface at a predetermined temperature;
obtaining the first temperature;
obtaining the second temperature;
selecting values for one or more constants in the function such that the temperature adjustment corresponds to the predetermined temperature.

Aspect 13. The method according to any of aspects 8-12, further comprising obtaining a third temperature at a third position within the sensor, the third position that is separated from the first position and the second position and wherein the temperature adjustment is a function of the first temperature, the second temperature, and the third temperature.

Aspect 14. A sensor module, comprising:
a sensor module body, including one or more walls defining an internal space;
a window;
an optical sensor, located within the sensor module body, the optical sensor configured to measure a temperature-variable property;
an intermediary material, located within the internal space and in contact with the window;
a first temperature sensor located within the intermediary material at a first position;
a second temperature sensor located within the intermediary material at a second position, the second position being farther from the window than the first position; and
a processor configured to:
receive a first temperature from the first temperature sensor;
receive a second temperature from the second temperature sensor; and
determine a temperature adjustment as a function of the first temperature and the second temperature.

Aspect 15. The sensor module according to aspect 14, wherein the temperature-variable property is an extrapolated refractive index.

Aspect 16. The sensor module according to any of aspects 14-15, further comprising a third temperature sensor located within the intermediary material at a third position, that is separated from the first and second positions,
wherein the processor is configured to receive a third temperature from the third temperature sensor, and
the temperature adjustment is a function of the first temperature, the second temperature, and the third temperature.

Aspect 17. The sensor module according to any of aspects 14-16, wherein the processor is further configured to adjust the extrapolated refractive index based on the temperature adjustment.

Aspect 18. The sensor module according to any of aspects 14-17, wherein the processor is included on a circuit board that is separate from the intermediary material.

Aspect 19. The sensor module according to any of aspects 14-18, wherein the function of the first temperature and the second temperature is a linear function.

Aspect 20. A method for determining a temperature at a first surface of an object, the object having a second surface opposite the first, comprising:
obtaining a first temperature at the second surface;
obtaining a second temperature at a position spaced apart from the second surface, the position separated from the second surface by an intermediary material having a fixed thermal conductivity; and
determining the temperature at the first surface of the object as a function of the first temperature and the second temperature.

Aspect 21. The method according to aspect 20, wherein the object is a window of an optical sensor.

Aspect 22. The method according to any of aspects 20-21, wherein the function of the first temperature and the second temperature is a linear function.

Aspect 23. The method according to any of aspects 20-22, wherein the function of the first temperature and the second temperature is determined by a calibration process including:
providing a flow of a reference fluid over the first surface at a predetermined temperature;
obtaining the first temperature;
obtaining the second temperature; and
selecting values for one or more constants in the function such that the temperature adjustment corresponds to the predetermined temperature.

Aspect 24. The method according to any of aspects 20-23, further comprising obtaining a third temperature at second position, spaced apart from the second surface and the position where the second temperature is obtained.

Having thus described several illustrative embodiments of the present disclosure, those of skill in the art will readily appreciate that yet other embodiments may be made and used within the scope of the claims hereto attached. Numerous advantages of the disclosure covered by this document have been set forth in the foregoing description. It will be understood, however, that this disclosure is, in many respect, only illustrative. Changes may be made in details, particularly in matters of shape, size, and arrangement of parts without exceeding the scope of the disclosure. The disclosure's scope is, of course, defined in the language in which the appended claims are expressed

What is claimed is:

1. A refractive index sensor, comprising:
   a sensor module body, including one or more walls defining an internal space;
   a window;
   an optical refractive index sensor located within the sensor module body, the optical refractive index sensor configured to measure refractive index;
   an intermediary material located within the internal space and in contact with the window;
   a first temperature sensor located within the intermediary material at a first position;
   a second temperature sensor located within the intermediary material at a second position, the second position being farther from the window than the first position; and
   a processor configured to:
      receive a first temperature from the first temperature sensor;
      receive a second temperature from the second temperature sensor; and
      determine a temperature adjustment as a function of the first temperature and the second temperature; and
      adjust an extrapolated refractive index value from the optical refractive index sensor based on the temperature adjustment.

2. The refractive index sensor of claim 1, further comprising a third temperature sensor located within the intermediary material at a third position, that is separated from the first and second positions,
 wherein the processor is configured to receive a third temperature from the third temperature sensor, and
 the temperature adjustment is a function of the first temperature, the second temperature, and the third temperature.

3. The refractive index sensor of claim 1, wherein the intermediary material has a thermal conductivity that is greater than a thermal conductivity of the one or more walls.

4. The refractive index sensor of claim 1, wherein the processor is included on a circuit board that is separate from the intermediary material.

5. The refractive index sensor of claim 1, wherein the first temperature sensor contacts the window.

6. The refractive index sensor of claim 1, wherein the first temperature sensor is fixed to the window by a temperature-conductive adhesive.

7. The refractive index sensor of claim 1, wherein the function of the first temperature and the second temperature is a linear function.

8. A method of temperature compensation in a sensor, comprising:
 obtaining a temperature-variable property at a measurement surface;
 obtaining a first temperature at a first position within the sensor;
 obtaining a second temperature at a second position within the sensor, the second position being farther from the measurement surface than the first position;
 determining a temperature adjustment as a function of the first temperature and the second temperature; and
 adjusting the measured temperature-variable property based on the determined temperature adjustment,
 wherein the first position within the sensor and the second position within the sensor are separated by an intermediary material;
 wherein the intermediary material fills a space defined by a plurality of walls.

9. The method of claim 8, wherein the measurement surface is at a window of the sensor.

10. The method of claim 8, wherein the function of the first temperature and the second temperature is a linear function.

11. The method of claim 8, wherein the temperature-variable property is a refractive index.

12. The method of claim 8, wherein the function of the first temperature and the second temperature is determined by a calibration process including:
 providing a flow of a reference fluid over the measurement surface at a predetermined temperature;
 obtaining the first temperature;
 obtaining the second temperature;
 selecting values for one or more constants in the function such that the temperature adjustment corresponds to the predetermined temperature.

13. The method of claim 8, further comprising obtaining a third temperature at a third position within the sensor, the third position that is separated from the first position and the second position and wherein the temperature adjustment is a function of the first temperature, the second temperature, and the third temperature.

14. A sensor module, comprising:
 a sensor module body, including one or more walls defining an internal space;
 a window;
 an optical sensor, located within the sensor module body, the optical sensor configured to measure a temperature-variable property;
 an intermediary material, located within the internal space and in contact with the window;
 a first temperature sensor located within the intermediary material at a first position;
 a second temperature sensor located within the intermediary material at a second position, the second position being farther from the window than the first position; and
 a processor configured to:
  receive a first temperature from the first temperature sensor;
  receive a second temperature from the second temperature sensor; and
  determine a temperature adjustment as a function of the first temperature and the second temperature.

15. The sensor module of claim 14, wherein the temperature-variable property is an extrapolated refractive index.

16. The sensor module of claim 14, further comprising a third temperature sensor located within the intermediary material at a third position, that is separated from the first and second positions,
 wherein the processor is configured to receive a third temperature from the third temperature sensor, and
 the temperature adjustment is a function of the first temperature, the second temperature, and the third temperature.

17. The sensor module of claim 14, wherein the processor is further configured to adjust the refractive index based on the temperature adjustment.

18. The sensor module of claim 14, wherein the processor is included on a circuit board that is separate from the intermediary material.

19. The sensor module of claim 14, wherein the function of the first temperature and the second temperature is a linear function.

* * * * *